US006688600B2

(12) United States Patent
Kawada et al.

(10) Patent No.: US 6,688,600 B2
(45) Date of Patent: Feb. 10, 2004

(54) MACHINE HAVING AN OIL SEAL

(75) Inventors: Keiichi Kawada, Saitama (JP); Toshiaki Yanagawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/963,704

(22) Filed: Sep. 27, 2001

(65) Prior Publication Data

US 2002/0038937 A1 Apr. 4, 2002

(30) Foreign Application Priority Data

Sep. 29, 2000 (JP) ....................................... 2000-300965

(51) Int. Cl.[7] .................................................. F16J 3/00
(52) U.S. Cl. ......................... 277/321; 277/317; 277/551
(58) Field of Search ................................ 277/500, 549, 277/551, 560, 572, 573, 574, 576, 577, 321, 317

(56) References Cited

U.S. PATENT DOCUMENTS 2,584,705 A * 2/1952 Hornschuch ................ 277/321
4,436,310 A * 3/1984 Sawabe et al. ............. 277/321
4,766,858 A * 8/1988 Yoshidome et al. .... 123/195 R
5,118,121 A * 6/1992 Hellman, Sr. ............... 277/650
5,531,573 A * 7/1996 Nokubo ...................... 277/648
6,264,515 B1 * 7/2001 Mineno et al. .......... 123/90.31
6,367,803 B1 * 4/2002 Loth .......................... 277/321

FOREIGN PATENT DOCUMENTS

JP 10-317935 * 2/1998
JP 10-317935 12/1998

* cited by examiner

*Primary Examiner*—William L. Miller
*Assistant Examiner*—André L. Jackson
(74) *Attorney, Agent, or Firm*—Armstrong, Kratz, Quintos, Hanson & Brooks, LLP

(57) ABSTRACT

In an internal combustion engine which is a machine having an oil seal in which an oil seal mounted between a through hole through which a balance shaft is allowed to pass and a circumferential surface of the through hole is covered entirely by a cover, a retaining plate adapted to cover at least part of the oil seal is fixed with a bolt within the cover, whereby the oil seal is retained by the retaining plate at an axial setting position within the through hole. The, an extending portion is provided on the retaining plate in such a manner as to extend outwardly of the cover, so that the mounting of the retaining plate can be confirmed from the outside of the cover.

14 Claims, 7 Drawing Sheets

MACHINE HAVING AN OIL SEAL

BACKGROUND OF THE INVENTION

1. Field of the Invention

The present invention relates to a machine having an oil seal which includes a cover for covering the oil seal mounted between a rotating shaft and a housing, and a retaining member for retaining the oil seal at a set position in a through hole in the interior of the cover.

2. Description of the Related Art

Conventionally, in a machine, such as an internal combustion engine, having a rotating shaft and a housing having a through-hole through which the rotating shaft is passed, an oil seal is mounted between the rotating shaft and a circumferential wall of the through-hole. The oil seal prevents lubricating oil which is supplied to a bearing portion for supporting the rotating shaft to the outside of the housing from leaking through the through-hole. Then, in order to prevent the decrease in sealing function of the oil seal that would occur when the oil seal is axially dislocated within the through-hole due to vibrations of the internal combustion engine, the oil seal is press fitted in the through-hole with a relatively large press-fit margin, or there is provided a member for preventing the occurrence of such a deviation.

An engine for an outboard motor disclosed in JP-A-10-317935 as an example of the latter case is structured as follows. One end portion of a crankshaft which is oriented vertically extends upwardly through a boss portion for a crankshaft-bearing formed at an upper portion of a crankcase. A bearing for supporting the crankshaft is disposed at a lower portion in the interior of the boss portion. An oil seal is disposed in an upper portion in the interior of the boss portion. Then, a breather cover closes a breather chamber adjacent to the boss portion. An extending portion formed on a circumferential portion of the breather cover covers above the oil seal, whereby even if the oil seal is dislocated upwardly in the interior of the boss portion, the oil seal is brought into abutment with the extending portion to thereby prevent the dislocation of the oil seal from the boss portion.

As is disclosed in the above Japanese unexamined patent publication, the decrease in sealing function of the oil seal due to the dislocation thereof is prevented with the simple construction in which the retaining member is provided for preventing the dislocation of the oil seal. In a machine in which an oil seal is covered entirely by a cover after the oil seal is mounted on the machine, however, since the retaining member is also covered by the cover, the retaining member is completely covered by the cover after the cover is mounted, and therefore that the retaining member is mounted cannot be confirmed from the outside of the cover. Alternatively, since the retaining member is hidden by another member disposed in the vicinity thereof, it becomes extremely difficult to confirm the attachment of the retaining member from the outside of the cover. In order to implement the confirmation, the cover needs to be removed, thus causing a problem that a certain length of time is required to confirm that the retaining member is mounted.

SUMMARY OF THE INVENTION

The invention was made in view of these situations, and a common object of first to sixth aspects of the invention is to construct a machine having an oil seal in which a cover is provided for covering the entirety of the oil seal such that whether or not a retaining member for retaining the oil seal at a set position in a through-hole is mounted can easily be confirmed from the outside of the cover so as to improve the working efficiency in confirming that the retaining member is mounted.

An object of the second to fifth aspects of the invention is to make it possible to confirm that the retaining member is mounted with a simple construction.

In addition, an object of the third aspect of the invention is to reduce limitations to the layout of members provided in the interior of the cover where the retaining member is mounted despite the fact that the retaining member is fixed by a fixing member.

Furthermore, an object of the fourth aspect of the invention is to make it possible to mount the retaining member even after the cover has been mounted to thereby improve the working efficiency in mounting the retaining member.

Moreover, an object of the sixth aspect of the invention is not only to enhance the rigidity of the retaining member but also to improve the working efficiency in mounting the retaining member.

According to the first aspect of the invention, there is provided a machine having an oil seal comprising a housing having a through-hole formed therein for allowing a rotating shaft to pass therethrough, an oil seal mounted between the rotating shaft and a circumferential wall of the through-hole and a cover mounted on the housing so as to abut with a mating surface of the housing in such a manner as to cover the entirety of the oil seal, wherein a retaining member which occupies a retaining position to cover at least part of the oil seal in the interior of the housing is fixed by fixing member so that the oil seal is retained at an axial set position in the through-hole by the retaining member, and wherein confirmation means is provided for confirming the attachment of the retaining member from the outside of the cover.

According to the first aspect of the invention, even if the oil seal is caused to move axially in the through hole due to vibrations of the housing, since the oil seal is retained at the axial set position in the through hole by the retaining member, the decrease in sealing function of the oil seal is prevented that would otherwise be caused by the movement. In addition, despite the fact that the retaining member is adapted to cover the oil seal in the interior of the cover which is brought into abutment with the mating surface of the housing so as to cover the entirety of the oil seal, since there is provided the confirmation means, whether or not the retaining member is mounted can easily be confirmed from the outside of the cover. As a result, since there is provided the confirmation means for confirming that the retaining member is mounted from the outside of the cover, that the retaining member is mounted can easily be confirmed even after the cover is mounted, whereby the working efficiency in confirming that the retaining member is mounted can advantageously be improved.

According to the second aspect of the invention, there is provided a machine having an oil seal as set forth in the first aspect of the invention, wherein the confirmation means is an extension of the retaining member which extends to the outside of the cover.

According to the second aspect of the invention, whether or not the retaining member is mounted is easily confirmed by seeing whether or not the extension extends to the outside of the cover. As a result, in addition to the advantage provided under the first aspect of the invention, the confirmation that the retaining member is mounted can advantageously be eased with the simple construction in which part of the retaining member is allowed to extend to the outside of the cover.

According to the third aspect of the invention, there is provided a machine having an oil seal as set forth in the second aspect of the invention, wherein the retaining member is fixed to the housing at the extension by the fixing member.

According to the third aspect of the invention, the retaining member is fixed to the housing outside the housing. As a result, in addition to the advantage provided under the second aspect of the invention, since the retaining member is fixed outside the cover, even if the fixing member is not provided inside the cover or is provided inside the cover, the number of fixing members can be reduced, and limitations to the layout of members provided in the interior of the cover by the fixing member or effects of provision of the fixing member on the members can be reduced, in turn, whereby a large degree of freedom in the layout of the members can advantageously be secured.

According to the fourth aspect of the invention, there is provided a machine having an oil seal as set forth in the third aspect of the invention, wherein the retaining member can be inserted into the interior of the cover from a gap formed between the cover and the mating surface of the housing in association with the elastic deformation of the cover so as to occupy the retaining position.

According to the fourth aspect of the invention, the retaining member can be fixed to the housing even after, as well as before, the cover is mounted. Namely, after the cover has been mounted, the extension located outside the cover is grabbed so that the retaining member is inserted into the interior of the cover through the gap formed by elastically deforming the cover so mounted so as to be set at the retaining position, and thereafter the extension can be fixed to the housing outside the cover.

As a result, in addition to the advantage provided under the third aspect of the invention, the retaining member is inserted into the interior of the cover through the gap formed between the cover and the mating surface of the housing when the cover is elastically deformed, and after the retaining member is set at the retaining position, the retaining member is fixed with the extension located outside the cover. Thus, the retaining member can be mounted even after the cover has been mounted. For example, in a case where it is found out that the retaining member is not mounted after the cover has been mounted, since the retaining member can be mounted without removing the cover, the working efficiency in mounting the retaining member can advantageously be improved.

According to the fifth aspect of the invention, there is provided a machine having an oil seal as set forth in the first aspect of the invention, wherein the confirmation means is an opening formed in the cover for allowing the retaining member to be seen therethrough.

According to the fifth aspect of the invention, whether or not the retaining member is mounted can easily be confirmed by seeing through the opening formed in the cover. As a result, in addition to the advantage provided under the first aspect of the invention, the confirmation that the retaining member is mounted can advantageously be eased with the simple construction in which the opening is formed in the cover.

According to the sixth aspect of the invention, there is provided a machine having an oil seal as set forth in any of the first to fifth aspects of the invention, wherein the retaining member which is to be fixed to the housing by the fixing member is a retaining plate formed of a sheet material, and wherein a curved portion is formed on the retaining plate for engagement with an engagement portion provided on the housing to thereby prevent the rotation thereof.

According to the sixth aspect of the invention, the rigidity of the retaining plate formed of a sheet material is enhanced by forming the curved portion, and the rotation of the retaining plate is prevented through engagement of the curved portion with the engagement portion. As a result, in addition to the advantages provided under the cited aspects of the invention, the following advantage can be provided. Namely, since the rigidity of the retaining plate formed of a sheet material is enhanced by forming the curved portion, the thickness of the retaining plate can be reduced and hence the weight thereof can be reduced in turn. On top of that, since the rotation of the retaining member is prevented by making use of the curved portion in such a manner that the curved portion is brought into engagement with the engagement portion, when compared with a case in which the rotation of the retaining plate is prevented using the fixing member, the rotation of the retaining plate can be implemented through the engaging operation which requires a shorter length of time, thereby improving the working efficiency in mounting the retaining plate.

Note that when used in this specification, the axial direction means a direction of a rotating axis of the rotating shaft (in the following first to fourth embodiments, a balance shaft).

DETAILED DESCRIPTION OF THE PREFERRED EMBODIMENTS

Referring to FIGS. 1 to 7, embodiments of the invention will be described below.

Figure 1:
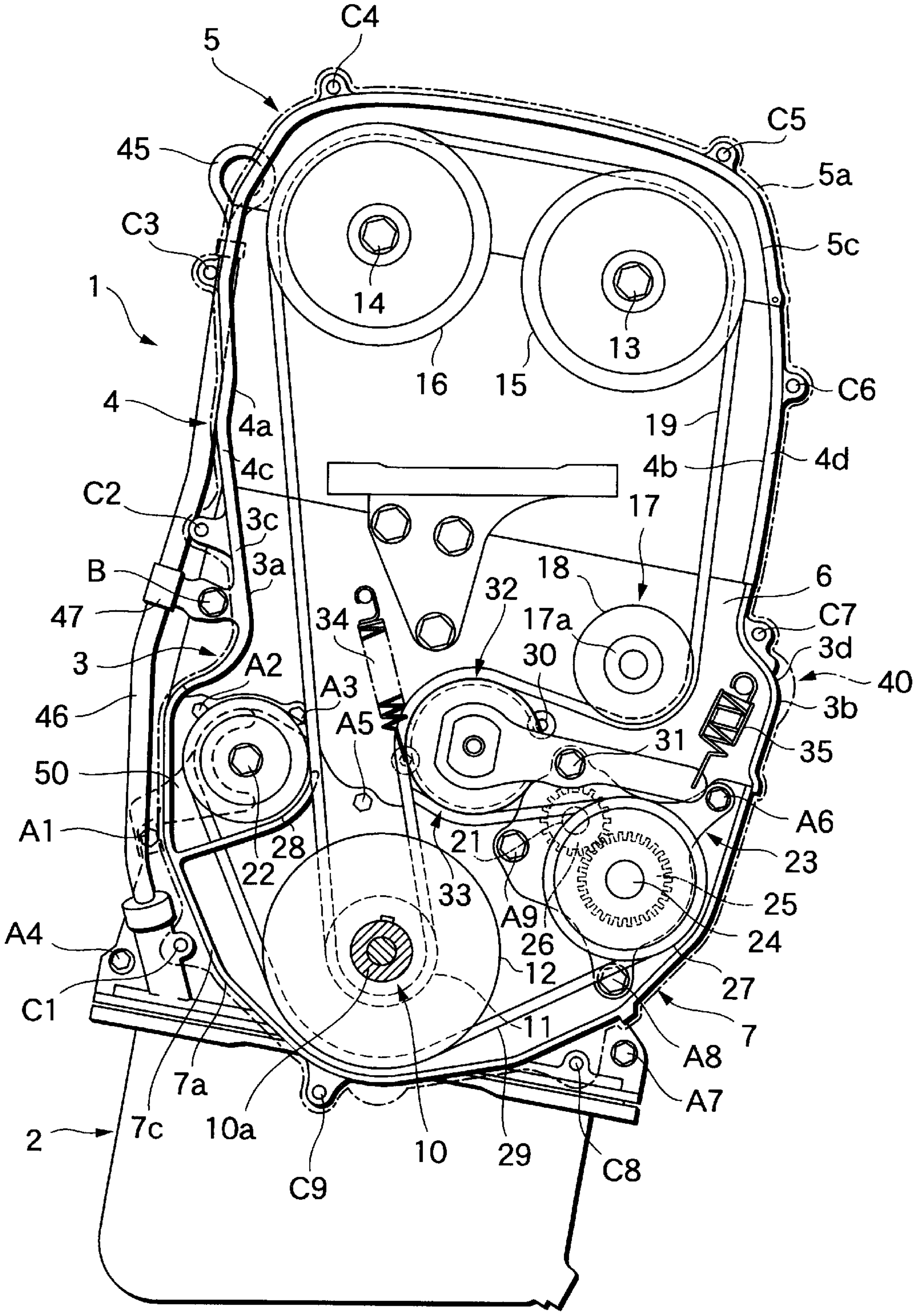
FIG. 1 is a side view showing a state in which a cover of an internal combustion engine having a balance shaft is removed according to a first embodiment of the invention.
Figure 2:
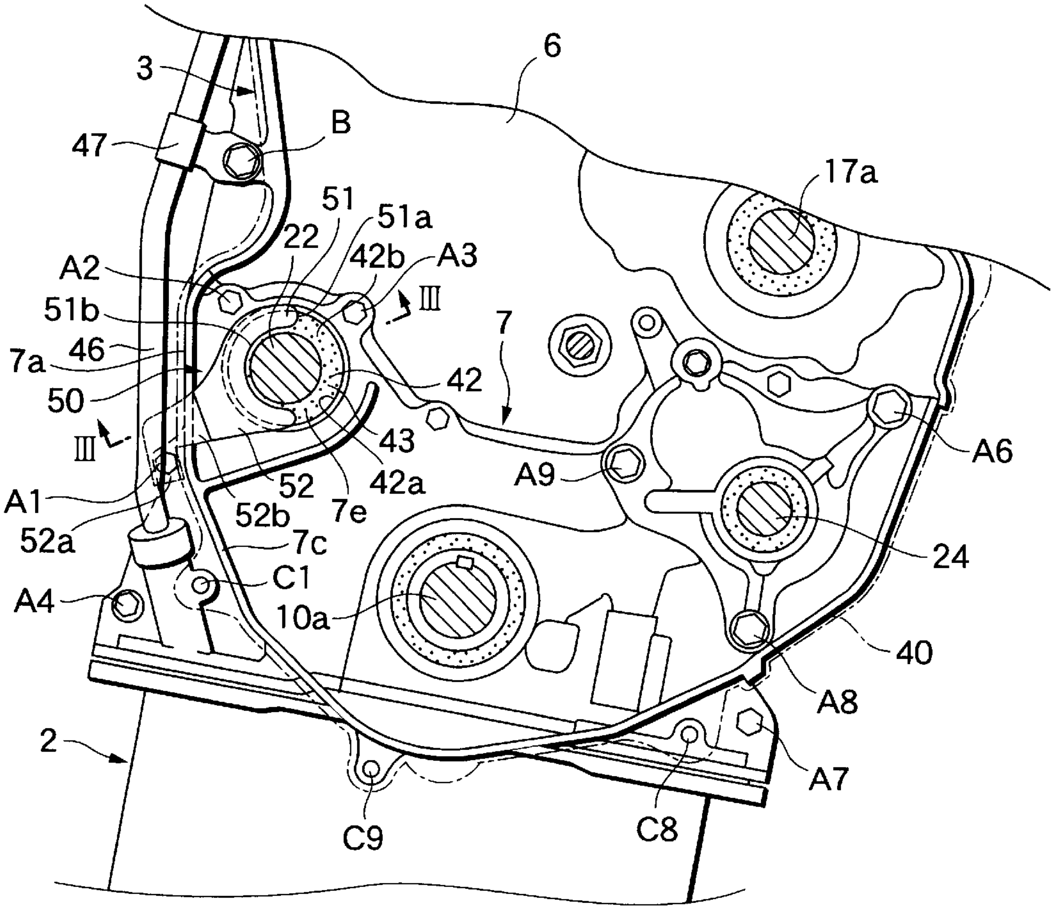
FIG. 2 is an enlarged view showing a main part with pulleys and timing belts in FIG. 1 removed.
Figure 3:
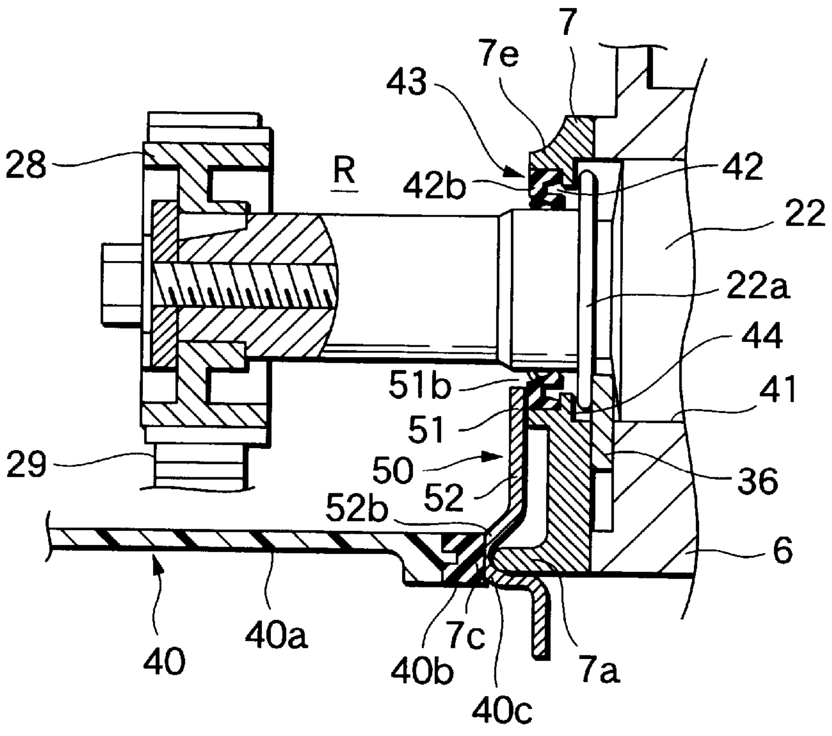
FIG. 3 is a longitudinal cross-sectional view taken along the line III—III in FIG. 2.

A first embodiment illustrated in FIGS. 1 to 3 corresponds to the first to fourth and sixth aspects of the invention, and a machine having an oil seal is an internal combustion engine 1. This internal combustion engine 1 is a four-cylinder in-line internal combustion engine with double overhead camshafts and is mounted at the front of a vehicle as a so-called transverse internal combustion engine in which a crankshaft 10 is directed transversely.

Referring to FIG. 1 in which the crankshaft 10 is illustrated in cross section, a cylinder head 4 is joined to an upper end portion of a cylinder block 3 which rotatably supports the crankshaft 10 to thereby form a main body of the engine. An oil pan 2 is joined to a lower end portion of the cylinder block 3 to thereby form a crankcase. A valve cover 5 is joined to an upper end portion of the cylinder head 4 to thereby form a valve chamber. Here, the crankcase and the valve chamber are each formed into a closed space where there exists lubricating oil, and therefore the oil pan 2, the cylinder block 3, the cylinder head 4 and the valve cover 5 are part of a housing which forms the closed spaces.

As is already well known, four pistons (not shown) are slidably fitted, respectively, in four cylinder bores formed in a cylinder portion of the cylinder block 3, and reciprocating motions of the respective pistons are transmitted to the crankshaft 10 via connecting rods, whereby the crankshaft 10 is driven to rotate.

An axial end portion 10*a* of the crankshaft 10 extends to penetrate a side wall 6 of the cylinder block 3. A first drive pulley 11, a second drive pulley 12 and a third drive pulley (not shown) are connected to the axial end portion 10*a* in that order as seen from the side wall 6 toward the axial end of the crankshaft 10. A trochoidal oil pump (not shown) is provided between the side wall 6 and the first drive pulley 11. The oil pump comprises a pump body 7 for accommodating both an outer rotor and an inner rotor inscribed in the outer rotor and connected to the crankshaft 10 so as to be driven to rotate. The pump body 7 is fastened to the cylinder block 3 at the side wall 6 with a plurality of bolts A1, A2, A3 . . . disposed along a circumferential edge portion of the pump body 7.

An intake camshaft 13 and an exhaust camshaft 14 for driving valve trains for opening and closing intake valves and exhaust valves, respectively, are rotatably supported on the cylinder head 4. Then, a first timing belt 19 as a first endless power transmitting belt is extended to be wrapped around the first drive pulley 11, first and second cam pulleys 15, 16, and a pump pulley 18. The first and second cam pulleys 15, 16 are connected to the intake camshaft 13 and the exhaust camshaft 14, respectively. The pump pulley 18 is connected to a drive shaft 17*a* of a cooling water pump 17 which is rotatably supported in the cylinder block 3. Thus, the intake camshaft 13 and the exhaust camshaft 14 are driven to rotate at a one half speed reduction ratio with respect to the crankshaft 10. Then, a first transmission system is constituted by the pulleys 11, 15, 16, 18 and the first timing belt 19.

In addition, a pair of first and second balance shafts 21, 22 having rotating axes which are parallel to the rotating axis of the crankshaft 10 are rotatably supported in the cylinder block 3 at positions which are located diagonally upwardly of the crankshaft 10 and are symmetrical with respect to an imaginary plane including the rotating axis of the crankshaft 10 and center lines of the respective cylinder bores. Here, the second balance shaft 22 is disposed more frontward (leftward in FIG. 1) on the vehicle than the first balance shaft 21. A gear case 23 is fastened to the cylinder block 3 together with the pump body 7 with a plurality of bolts A6, A8, A9 at a portion of the pump body 7 where an axial end portion of the first balance shaft 21 is rotatably supported. And, a drive gear 25 connected to an intermediate shaft 24 rotatably supported in the gear case 23 and a follower gear 26 connected to the axial end portion of the first balance shaft 21 mesh with each other in a gear chamber formed by the gear case 23 and the pump body 7. A second timing belt 29 as a second endless power transmission belt is extended to be wrapped around the second drive pulley 12, a first follower pulley 27 connected to an axial end portion of the intermediate shaft 24 which protrudes from the gear case 23 and a second follower pulley 28 connected to an axial end portion of the second balance shaft 22 which extends through the pump body 7, whereby the first and second balance shafts 21, 22 are driven to rotate in opposite directions to each other at an speed increasing ratio which is double that of the crankshaft 10. Thus, the first and second balance shafts 21, 22 cancel the secondary inertia force of the reciprocating pistons to thereby reduce secondary vibrations that would otherwise be generated by the secondary inertia force. Then, a second transmission system is constituted by the pulleys 12, 27, 28 and the second timing belt 29.

Furthermore, first and second support shafts 30, 31 are fixed to the cylinder block 3. A first tensioner 32 which is swingably supported on the first support shaft 30 regulates the tension of the first timing belt 19 by virtue of the spring force of a spring 34, and a second tensioner 33 which is swingably supported on the second support shaft 31 regulates the tension of the second timing belt 29 by virtue of the spring force of a spring 35.

The entireties of first and second transmission systems, first and second tensioners 32, 33, second balance shaft 22 and gear case 23 are encompassed by a circumferential edge wall S1 which is constituted by an arc-like circumferential edge wall 7*a* axially protruding from the pump body 7, front and rear circumferential edge walls 3*a*, 3*b* axially protruding from the cylinder block 3, front and rear circumferential edge walls 4*a*, 4*b* axially protruding from the cylinder head 4 and an arc-like circumferential edge wall 5*a* axially protruding from the valve cover 5. And, the first and second transmission systems, first and second tensioners 32, 33, second balance shaft 22 and gear case 23 are accommodated in a transmission chamber R. The transmission chamber R is formed by being covered with a cover 40 having a mating surface 40*c* adapted to abut with substantially the full circumference of a mating surface S2 constituted by mating surfaces 7*c*, 3*c*, 3*d*, 4*c*, 4*d*, 5*c* which are each axial end faces of the respective circumferential edge walls 7*a*, 3*a*, 3*b*, 4*a*, 4*b* in the encompassed state by the circumferential edge wall S1. Note that while the contour of the cover 40 shown in FIGS. 1, 2, 4, 5 and 7 is adapted to substantially overlap the outer circumferential contour of the mating surface S2 in reality, the contour of the cover 40 is illustrated as being slightly larger than the reality for the sake of easy understanding. The cover 40 is then mounted on the pump body 7, the cylinder block 3, the cylinder head 4 and the valve cover 5 by being secured a; with a plurality of bolts (not shown) adapted to be thread fitted in threaded holes C1, C2, C3 . . . formed in the pump body 7, the cylinder block 3 and the cylinder head 4 at intervals, respectively. In addition, the mating surface 40*c* of the cover 40 is constituted by a seal member 40*b* made of synthetic rubber which is secured to an end face of a circumferential edge portion of a cover main body 40*a* made from synthetic resin (refer to FIG. 3). Note that a through hole is formed in the cover 40 at a location confronting an end face of the axial end portion 10*a* of the crankshaft 10, and the third drive pulley is fixed to the axial end portion 10*a* of the crankshaft 10 which passes through the through hole for driving accessories such as an alternate current generator and a compressor.

As shown in FIGS. 2 and 3, the balance shaft 22 is supported in a bearing hole which acts as a bearing portion provided in the cylinder block 3 within the crankcase. The balance shaft 22 passes through a bearing hole 41 formed in the side wall 6 and then a through hole 42 formed in the pump body 7 and eventually protrudes into the transmission chamber R. An annular oil seal 43 is mounted between the second balance shaft 22 and a cylindrical wall 42*a* of the through hole 42 for preventing lubricating oil in the crankcase from leaking into the transmission chamber R. Consequently, the pump body 7 constitutes the crankcase together with the oil pan 2 and the cylinder block 3 and is part of the housing. In addition, the entirety of the oil seal 43 is also covered by the cover 40.

The oil seal 43 is press fitted in the through-hole 42 in seated engagement with the cylindrical wall 42*a* such that an inner circumferential surface of the oil seal 43 is brought into contact with the second balance shaft 22, and the movement of the oil seal 43 to a crankcase side is prevented when the oil seal 43 comes into abutment with a flange portion 44 provided at a position on a crankcase side of the through hole 42 in such a manner as to radially extend from the cylindrical wall 42*a*.

Then, a retaining plate 50 is mounted in the pump body 7 which acts as a retaining means for retaining the oil seal 43 within the through-hole 42 at an axially set position where an intended seal function of the oil seal 43 is maintained. Specifically, the retaining plate 50 blocks the axial movement of the oil seal 43 within the through-hole 42 toward an opening 42*b* on a transmission chamber R side of the through-hole 42 which corresponds to, or exceeds, a predetermined value; that is, blocks the axial movement of the oil seal 43 which corresponds to or exceeds, an axially maximum traveling distance of the oil seal 43 where a decrease in sealing function which overpasses a permitted range occurs between the second balance shaft 22 and the circumferential wall 42*a* of the through-hole 42. This retaining plate 50 is formed of a steel sheet metal into a bifurcated fork-like member having a flat plate-like restricting portion 51 positioned relative to a boss portion 7*e* forming the opening 42*b* with a slight gap being maintained in the axial direction therebetween and a fixing arm 52 for fixing the retaining plate 50 to the pump body 7. The restricting portion 51*b* is formed in the semi-annular shape or U-shape, which has an opening 51*a* and forms a semi-circular recessed portion 51*b*. Then, when the retaining plate 50 is fixed at a set position, the restricting portion 51 is placed so as to occupy a retaining position where the restricting portion 51 covers both the opening 42*b* and the oil seal 43 circumferentially along substantially half the circumference thereof as well as the oil seal 43 radially over part of the radial width thereof. Furthermore, the restricting portion 51 forms a radial gap between the second balance shaft 22 and itself at the retaining position, whereby the retaining plate 50 and the second balance shaft 22 are maintained in a non-contact condition.

Additionally, the fixing arm 52, which radially extends in an opposite direction to a direction in which the restricting portion 51 opens, has at a part thereof an extending portion 52*a* which overpasses the circumferential edge wall 7*a* of the pump body 7 and extends outwardly of the cover 40. The portion of the fixing arm which overpasses the circumferential edge wall 7*a* is formed into a curved portion 52*b* which is curved so as to form a recessed groove for accommodating therein the circumferential edge wall 7*a* which protrudes axially. When this curved portion 52*b* is brought into engagement with the circumferential edge wall portion 7*a* which constitutes a raised portion on the pump body 7 and acts as an engagement portion, the rotation of the retaining plate 50 is prevented, whereby the non-contact condition of the retaining plate 50 and the second balance shaft 22 is maintained. Then, when the cover 40 is mounted, the mating surface 40*c* of the cover 40 is brought into abutment with a distal end face of the curved portion 52*b*. In addition, the extending portion 52*a* has a hole through which a bolt is allowed to pass and is fastened to the pump body 7 with a bolt A1 which is a fastening member acting as a single fixing member, whereby the retaining plate 50 is fixed to the pump body 7. The bolt A1 is located at a position outwardly of the circumferential edge wall 7*a* 40 and is nearest to the second balance shaft 22 among a plurality of bolts A1, A2, A3 . . . for fixing the pump body 7 to the cylinder block 3. Thus, even after the cover 40 has been attached, it can be confirmed from the outside of the cover 40 through the existence of the extending portion 52*a* extending outwardly of the cover 40 that the retaining plate 50 is mounted, and therefore the extending portion 52*a* constitutes a confirmation means for the attachment of the retaining plate 50.

Furthermore, the restricting portion 51 covers the portions of the opening 42*a* and the oil seal 43 which are on their sides nearer to the circumferential edge wall 7*a* which is situated at a shortest distance from the opening 42*b* and the oil seal 43. Thus, a dust preventing construction is provided for making difficult penetration of dust even in case dust tries to penetrate inwardly from between the two mating surfaces 7*c,* 40*c.*

While it is, of course, needless to say that the retaining plate 50 can be mounted before the cover 40 is attached, the retaining plate 50 can be mounted even after the cover 40 has been attached. Namely, the second balance shaft 22 is located at the position near to the circumferential edge wall 7*a* of the pump body 7, and the restricting portion 51 of the retaining plate 50 can approach the second balance shaft 22 in the radial direction through the opening 51*a* so as to occupy the retaining position. Owing to this construction, a tool or the like is inserted between the two mating surfaces 7*c,* 40*c* at a portion contained between two bolts for fixing the cover 40 when the cover 40 is put in a fixed condition which are adapted to thread fit in the threaded holes C1, C2 containing the portions of the mating surfaces 7*c,* 40*c* existing at the shortest distance from the second balance shaft 22. This operation elastically deforms the relatively thin cover 40 so as to be lifted up from the mating surface 7*c* of the pump body 7, whereby a gap is formed to such an extent that the retaining plate 50 is allowed to be inserted into the transmission chamber R, and the restricting portion 51 is moved toward the second balance shaft 22. Then, after the second balance shaft 22 is situated at the recessed portion 51*b* of the restricting portion 51 so as to occupy the retaining position, the curved portion 52*b* is brought into engagement with the circumferential edge wall 7*a,* and furthermore, the hole for the bolt A1 in the extending portion 52*a* is aligned with the through hole for the bolt A1 in the pump body 7, whereby the retaining plate 50 is fastened with the bolt A1.

Next, the operation and effectiveness of the embodiment constructed as described heretofore will be described below.

(I) Even if the oil seal 43 is moved in the axial direction within the through hole 42 due to the vibrations of the cylinder block 3 and the pump body 7 to thereby be moved toward the opening 42*b* when an internal combustion engine 1 is operated, the oil seal 43 is brought into abutment with the restricting portion 51 of the retaining plate 50, whereby the oil seal 43 is retained at the axially set position within the through hole 42, and thus the reduction in sealing function resulting from the movement of the oil seal 43 is prevented. Despite the fact that the holding plate 50 is mounted in such a manner as to cover the oil seal 43 with the restricting portion 51 thereof being left in the interior of the cover 40 (in the transmission chamber R) which abuts with the mating surface S2 along substantially the full circumference to thereby cover the entirety of the oil seal 43, since the extending portion 52*a* stays outside the cover 40, it can easily be confirmed from the outside of the cover 40 through the existence of the extending portion 52*a* whether or not the retaining plate 50 has been mounted. As a result of this, since there is provided the extending portion 52*a* with existence of which the mounting of the retaining plate 50 can be confirmed, confirmation of the retaining plate 50 can easily be implemented even after the cover 40 has been mounted, this improving the efficiency of operation of confirming the mounting of the retaining plate 50. Moreover, an advantage is provided that the setting of the retaining plate 50 can easily be confirmed with the simple construction in which the part of the retaining plate 50 is allowed to extend outwardly of the cover 40.

(II) Since the retaining plate 50 is fastened to the pump body 7 with the bolt A1 outside the cover 40 with no bolt being provided inside the transmission chamber R in the interior of the cover 40, there can be eliminated any interference of a bolt with the first and second timing belts 19, 29 and the respective pulleys 12, 28 which constitute the first and second transmission systems, respectively, in the interior of the cover 40. Thus, there is imposed no limitation to the layout of those constituent members, and therefore the influence of the bolt for fixing the retaining bolt 50 to those constituent members can be reduced. Thus, another advantage can be provided that a large degree of freedom in laying out the constituent members can be secured.

(III) The retaining plate 50 can be mounted even after the cover 40 has been mounted. Namely, since the restricting portion 51 of the retaining plate 50 has the configuration which allows the second balance shaft 22 to be accommodated in the recessed portion 51*b* through the opening 51*a* in the radial direction, the retaining plate 50 can be inserted into the cover 40 through the gap formed between the mating surfaces 7*c*, 40*c* by elastically deforming the cover 40 which has been mounted with the bolts at the portion of the cover 40 contained by the two bolts, with the extending portion 52*a* being grabbed, thereafter can be set at the retaining position and can then be fixed to the pump body 7 outside the cover 40. Thus, the retaining plate 50 can be fixed to the pump body 7 not only before the cover 40 is mounted but also after the cover 40 has been mounted. As a result of this, the following advantage can be provided. Namely, since the retaining plate 50 is inserted into the cover through the gap formed between the mating surface 7*c* of the pump body 7 and the cover 40 by elastically deforming the cover 40 and is then fixed to the pump body 7 at the extending portion 52*a* situated outside the cover 40 after it has been set at the retaining position, the retaining plate 50 can be mounted even after the cover 40 has been mounted. Thus, even in case it is found that the retaining plate 50 has not yet been mounted after the cover has been mounted, the retaining plate 50 can be mounted in place without removing the cover 40, the efficiency of a retaining plate mounting operation being thereby improved.

(IV) The rigidity of the retaining plate 50 which is formed of a sheet material is improved by the formation of the curved portion 52*b*, and moreover the retaining plate 50 is prevented from being rotated through the engagement of this curved portion 52*b* with the circumferential edge wall 7*a* constituting the mating surface 7*c* with the cover 40. As a result of this, the following advantage can be provided. Namely, since the rigidity of the retaining plate 50 which is formed of a sheet material is improved by the formation of the curved portion 52*b*, the retaining plate 50 can be made thin, whereby the weight thereof can be reduced. On top of that, since the rotation of the retaining plate 50 is prevented by making use of the curved portion 52*b* or by allowing the curved portion 52*b* to be brought into engagement with the circumferential edge wall 7*a*, the rotation preventing operation can be completed through the engagement operation needing a short period of time, this improving the efficiency of the retaining plate 50 plate mounting operation. Furthermore, the circumferential edge wall 7*a* constituting the mating surface 7*c* with the cover 40 can be used as a portion for locking the rotation of the retaining plate 50, no other locking portion needs to be provided separately, this simplifying the construction. Furthermore, since the seal member 40*b* of the cover 40 is allowed to be brought into abutment with the curved portion 52*b*, no other seal member needs to be provided separately, this obviating the necessity of formation of a seal between the retaining plate 50 and the cover 40.

(V) The restricting portion 51 covers the opening 42*b* and the portion of the oil seal 43 which is situated on the side closer to the circumferential edge wall 7*a* of the pump body 7, even in case dust penetrates inside from between the two mating surfaces 7*c*, 40*c*, the penetration of the dust into the through hole 42 in which the oil seal 43 is mounted is made difficult. As a result of this, the decrease in sealing function is suppressed which would be caused by heat generated by wear and/or friction of the oil seal 43 which would be caused if dust penetrated inside from between the two mating surfaces 7*c*, 40*c*.

(VI) Since the retaining plate 50 is provided form the oil seal 43 mounted on the second balance shaft 22 which is the rotating shaft situated at the front portion of the internal combustion engine 1 mounted at the front portion of a vehicle, the retaining plate 50 can easily be confirmed even in a state in which the internal combustion engine 1 has been set inside the engine compartment. As a result of this, since the retaining plate 50 is to situated at the front portion of the internal combustion engine 1, even in a state in which the internal combustion engine 1 is installed in the engine compartment the retaining plate 50 can easily be confirmed, this improving further the efficiency of the retaining plate confirming operation.

(VII) Since the retaining plate 50 is fastened to the pump body 7 by making use of the bolt A1 for fastening the pump body 7 to the cylinder block 3, no bolt which is exclusively used to fasten the retaining plate 50 to the pump body 7 needs to be provided, whereby the retaining plate 50 can be fixed in place without increasing the number of components.

Figure 4:
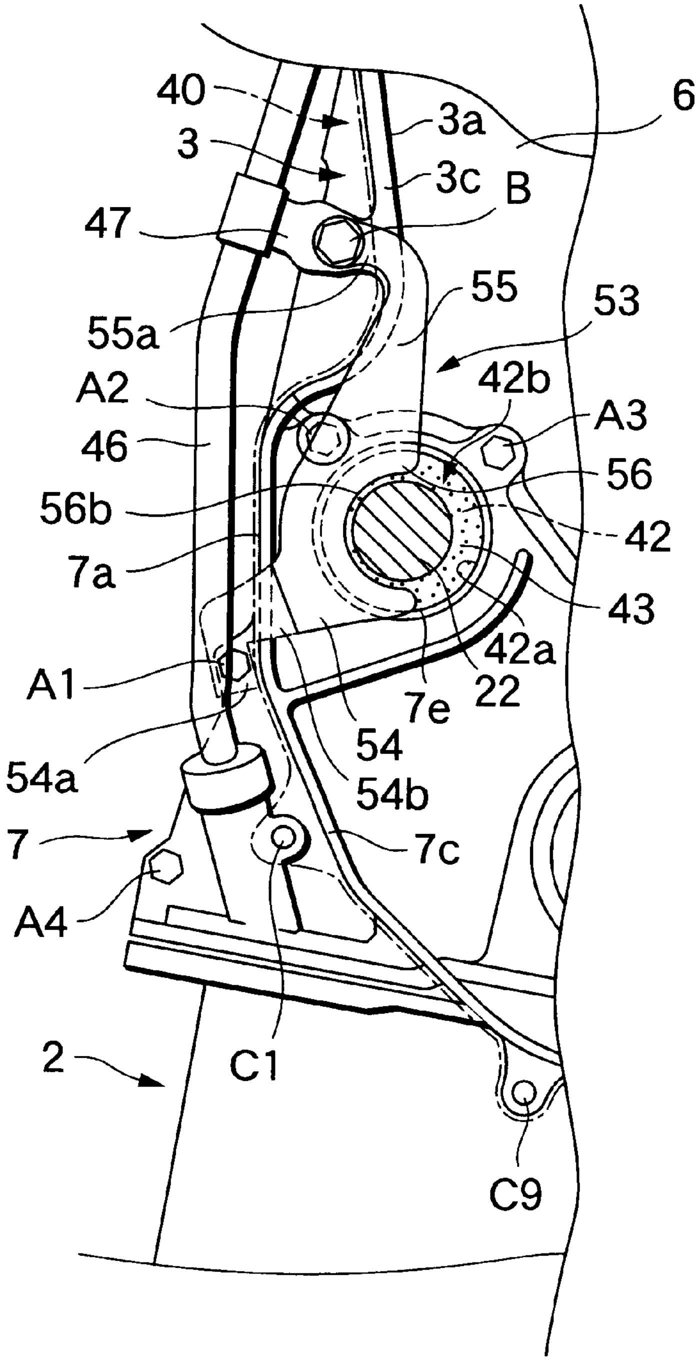
FIG. 4 is a partial view of a side elevation corresponding to FIG. 2 which shows a second embodiment of the invention.

Next, referring to FIG. 4, a second embodiment according to the invention will be described. This second embodiment corresponds to the first to fourth and sixth aspects of the invention, and the construction of a retaining plate according the second embodiment is different from that of the retaining plate described in the first embodiment with the other constituent components remaining the same in construction. Owing to this, the description will be concentrated to features specific to the second embodiment, while the description of the same portions is omitted or briefly made. Note that like reference numerals are given to members which are like or correspond to those described in the first embodiment.

In this second embodiment, a retaining plate 53 has a first fixing arm 54 which corresponds to the fixing arm 52 of the first embodiment and it has a second fixing arm 55 further. The first fixing arm 54 has a first extending portion 54*a* and a curved portion 54*b* which correspond to the extending portion 52*a* and the curved portion 52*b*, respectively, which have been described in the first embodiment. The first extending portion 54*a* is fastened to the cylinder block 3 together with the pump body 7, and the curved portion 54*b* is brought into engagement with the circumferential edge wall 7*a* of the pump body 7. A second fixing arm 55 extends upwardly from a restricting portion 56 similar to the restricting portion 51 of the first embodiment and is fastened to the cylinder block 3 together with a clamp 47 for fixing a guide pipe 46 into which an oil level gauge 45 (refer to FIG. 1) is inserted and guided, to the cylinder block 3 with a bolt B at a second extending portion 55*a* which overpasses the circumferential edge wall 3*a* of the cylinder block 3 to extend outwardly of the cover. Note that since an axial distance from the side wall 6 is substantially equal to that from a mating surface 3*c*, the second fixing arm 55 is formed into a flat plate-like configuration from a portion which is closer to the restricting portion 56 having a semi-circular portion 56*b* to the second extending portion 55*a*.

The operation and effectiveness of the second embodiment constructed as described above will be described.

The retaining plate 53 is fastened to the cylinder block 3 with the bolt A1 for fastening the pump body 7 to the cylinder block 3 and is then fastened to the cylinder block 3 by making use of the bolt B for fastening the clamp 47 to the cylinder block 3. Thus, the retaining plate 53 is fastened to the cylinder block 3 by making use of the bolts A1, B adapted to fasten the pump body 7 and the clamp 47 which are separate members from the retaining plate 53. As a result of this, since the retaining plate 53 is fastened to the cylinder block 3 by making use of the bolts for fastening the separate members, no bolt is required for exclusively fastening the retaining plate, and thus the retaining plate can be fastened without increasing the number of constituent components. Furthermore, since the second extending portion 55*a* is situated above the restricting portion 56, the confirmation of the mounting of the retaining plate 53 can be facilitated further.

Furthermore, similar operations and advantages to those described under (I) to (VI) in the first embodiment can also be provided in the second embodiment.

Next, referring to FIGS. 5 to 7, third and fourth embodiments according to the invention will be described. Both the third and fourth embodiments correspond to the first to fifth aspects of the invention and are different from the first embodiment with respect to the retaining plate and the cover, the constructions of the remaining portions thereof being basically identical to that of the first embodiment. Due to this, the description will be concentrated on the different features, and the description of members which are like or correspond to those in the first embodiment will be omitted or briefly made. Note that like reference numerals are used for those identical or corresponding to those of the first embodiment.

Figure 5:
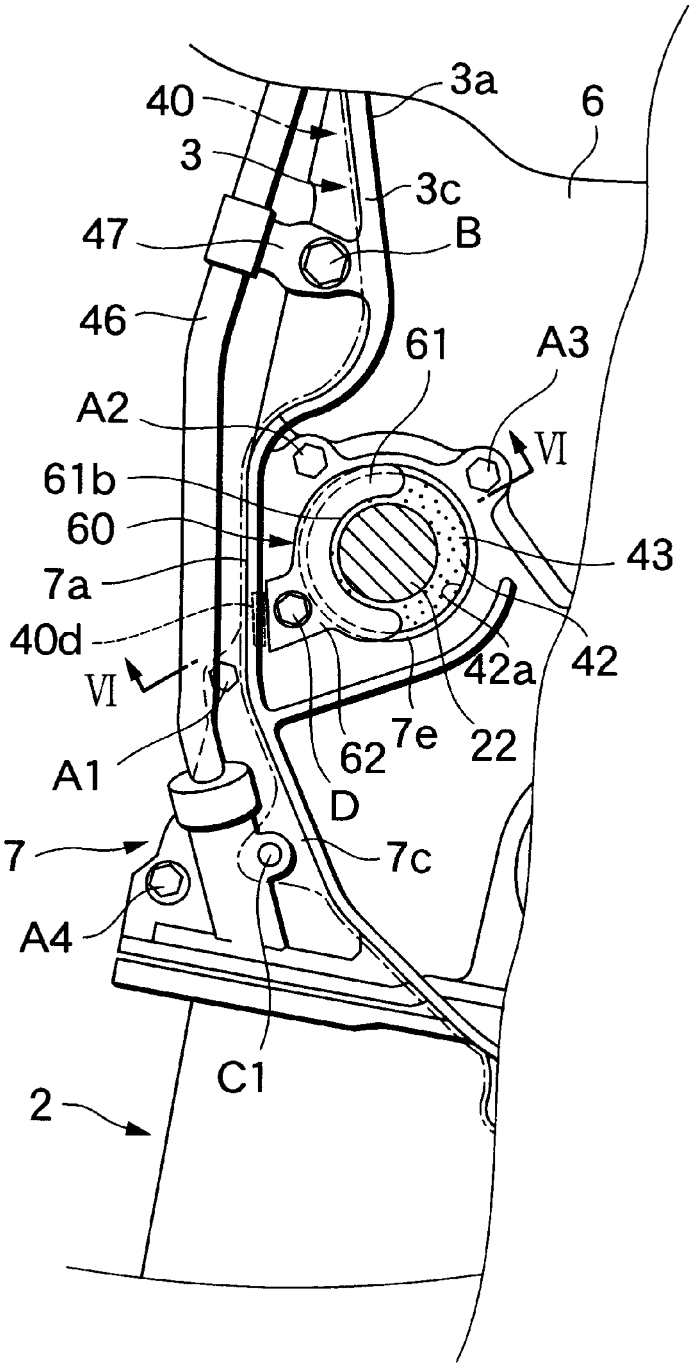
FIG. 5 is a view corresponding to FIG. 4 which shows a third embodiment of the invention.
Figure 6:
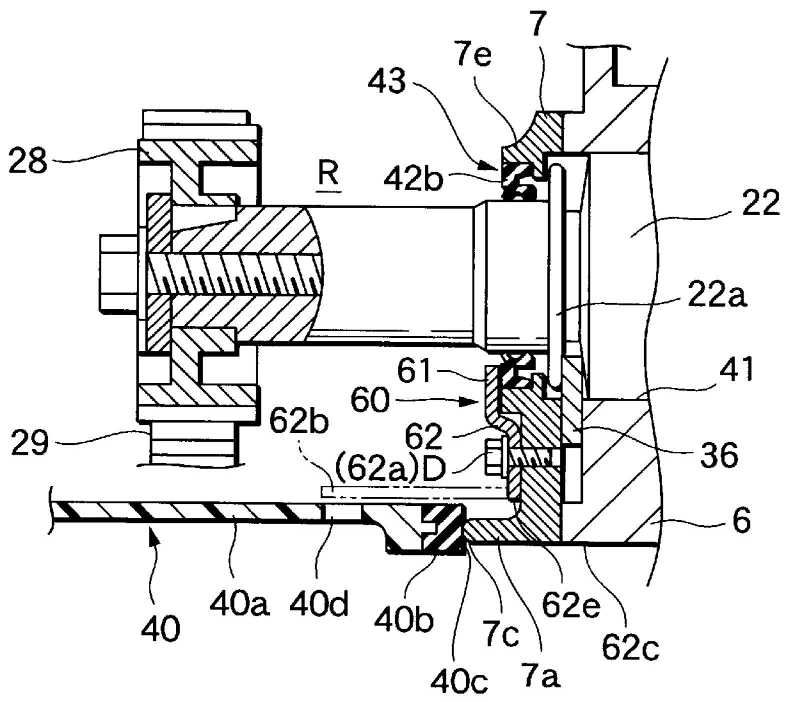
FIG. 6 is a longitudinal cross-sectional view taken along the line VI—VI in FIG. 5.
Figure 7:
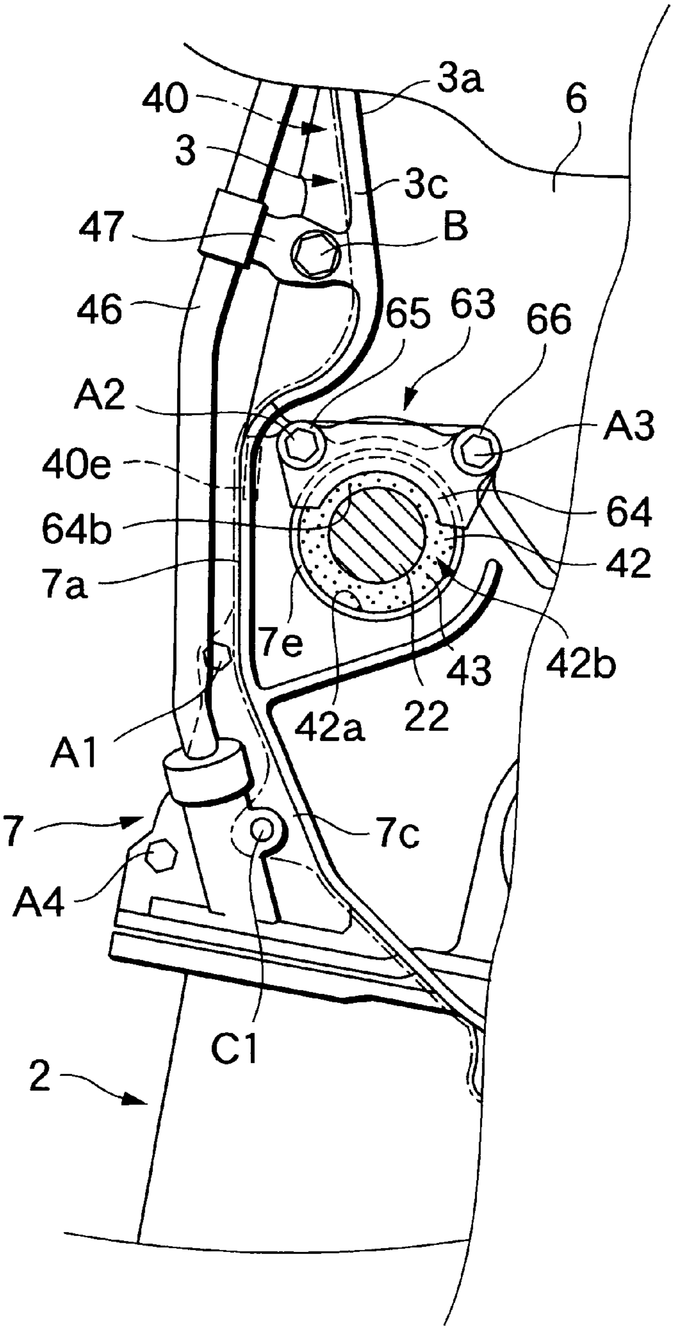
FIG. 7 is a view corresponding to FIG. 4 which shows a fourth embodiment of the invention.

Firstly, in the third embodiment, referring to FIGS. 5 and 6, a retaining plate 60 has a restricting portion 61 having a semi-annular or U-shaped configuration which forms a semi-circular recessed portion 61*b* which is similar to that in the first embodiment and a fixing arm 62 which extends in a radial direction which is opposite to the direction in which the restricting portion 61 opens. The fixing arm 62 is present in the interior of the cover 40, extends near the inner circumferential surface of the circumferential edge wall 7*a* of the pump body 7, and is fastened to the pump body 7 with a single bolt D which passes through a hole formed in the fixing arm 62 within the interior of the cover 40. Then, an opening 40*d* which opens forward is formed in the cover 40 at a position where whether or not the retaining plate 60 is mounted can be visually confirmed from the outside of the cover 40 at a portion which confronts an imaginary surface which is formed by extending an end face 60*a* of the fixing arm 62 which confronts the circumferential edge wall surface 7*a* in an axial direction along the circumferential edge wall 7*a*. Thus, even after the cover 40 has been mounted, the mounted retaining plate 60 can easily be confirmed from the outside of the cover 40 by watching through the opening 40*d*, and therefore this opening 40*d* constitutes a confirmation means for confirming the mounting of the retaining plate 60.

The operation and effectiveness of the third embodiment constructed as described above will be described.

Despite the fact that the entirety of the retaining plate 60 is accommodated in the interior of the cover 40, the retaining plate 60 when mounted in place can easily be visualized through the opening 40*d* formed in the cover 40, and therefore whether or not the retaining plate 60 has been mounted can easily be confirmed from the outside of the cover 40. As a result of this, since the opening 40*d* through which the mounted retaining plate 60 can be confirmed is formed in the cover 40, the confirmation of the retaining plate 60 can easily be implemented even after the retaining plate 60 has been mounted and the efficiency of the retaining plate 60 mounting confirmation operation can be improved. Moreover, since the mounted retaining plate 60 can easily be confirmed with a simple construction in which the opening 40*d* is formed in the cover 40 and the opening 40*d* opens frontward, there is provided an advantage that the efficiency of the retaining plate mounting confirmation operation can be improved further.

Furthermore, similar operations and advantages to those described in the first embodiment can also be provided in this third embodiment.

Next, referring to FIG. 7, the fourth embodiment according to the invention will be described.

In the fourth embodiment, a retaining plate 63 has a restricting portion 64 having a semi-annular or U-shaped configuration forming a semi-circular recessed portion 64*b* and two fixing arms 65, 66. Being different from those described in the first to third embodiments, the restricting portion 64 covers substantially upper halves of the opening 42*b* in the through hole 42 and the oil seal 43. In addition, both the fixing portions 65, 66 are fastened to the cylinder block 3 together with the pump body 7 with two bolts A2, A3 for fastening the pump body 7 to the cylinder block 3 within the cover 40. Additionally, as with the third embodiment, an opening 40*e* which opens frontward is formed in the cover at a position where whether or not the retaining plate 63 has been mounted can visually confirmed from the outside of the cover 40.

The operation and effectiveness of the fourth embodiment constructed as described above will be described.

The retaining plate 63 is fastened to the cylinder block 3 together with the pump body 7 by making use of the bolts A2, A3 both for fastening the pump body 7 which is a separate member. As a result of this, since the retaining plate 63 is fastened to the cylinder block 3 by making use of the bolts for fastening the separate member, no bolt is required exclusively to fasten the retaining plate 63, whereby the retaining plate 63 can be fixed without increasing the number of constituent components.

In addition, since the retaining plate 63 is fixed with the plurality of bolts adapted to fix the pump body 7, the retaining plate 63 functions as a reinforcement plate for the pump body 7 by virtue of the rigidity possessed by the retaining plate 63, the rigidity of the pump body 7 being thereby increased. As a result of this, the rigidity of the pump body 7 is increased by the retaining plate 63 fastened to the pump body 7, the vibrations of the pump body 7 being thereby suppressed.

Furthermore, operation and effectiveness similar to those described under (VI) of the first embodiment, as well as operation and effectiveness similar to those described under (VIII) of the third embodiment are provided.

Modifications made partly to the embodiments will be described below.

In the third embodiment, as indicated by double dashed lines in FIG. 6, the flat plate-like fixing arm 62 may be constructed such that the arm has a fixing portion 62*a* and a shielding portion 62*b* with a boundary formed by a folded portion 62*c* formed by folding the flat plate-like fixing arm 62 at an intermediate position along the length thereof. As this occurs, when the retaining plate 60 is fastened to the pump body 7 at the fixing portion 62*a* having a through hole through which a bolt D is allowed to pass, the folded portion 62*c* is situated slightly inwardly of the inner circumferential surface of the circumferential edge wall 7*a* of the pump body 7, and the shielding portion 62*b* extending axially from the folded portion 62*c* along the circumferential edge wall 7*a* covers substantially the whole surface of the opening 40*d* with a slight gap being formed between the opening 40*d* and itself.

According to this construction, since the shielding portion 62*b* is situated near the opening 40*d* and in such a manner as to cover substantially the whole surface of the opening 40*d*, not only can the confirmation of the retaining plate 60 be implemented extremely easily by a visual checking through the opening 40*d*, but also the penetration of dust from the outside into the interior of the cover 40 through the opening 40*d* can be suppressed.

In the respective embodiments, while the restricting portions 51, 56, 61, 64 of the retaining plates 50, 53, 60, 63 are such that the restricting portions cover substantially half the circumference of the oil seal 43 in the circumferential direction, in the first and second embodiments, the restricting portions may be such that they cover a range which is narrower than half the circumference of the oil seal 43, and a range over which the oil seal 43 is covered in the circumferential direction may be set suitably provided that the retaining plates 50, 53 can retain the oil seal 43 at the retaining position, and that when the retaining plates 50, 53 are inserted into the cover 40 from between the mating surfaces 7*c*, 40*c* after the cover 40 has been mounted the retaining plates 50, 53 can be set at the retaining position in the radial direction of the second balance shaft 22. In addition, in the third and fourth embodiments, the retaining plates may be such that the plates cover a range narrower or wider than half the circumference or the full circumference of the oil seal 43, and in any of the cases, a range over which the oil seal 43 is covered in the circumferential direction may be set suitably provided that the retaining plates 60, 63 can retain the oil seal 43 at the setting position. Furthermore, the invention can be applied to any rotating shaft where an oil seal is required to be mounted other than the balance shaft.

In the respective embodiments, while the cover 40 is fixed to the valve cover 5, the head cover 5 may be made independent from the cover 40, so that the cover 40 may be fixed to a back cover provided between the cover and the valve cover 5. In addition, the movement of the oil seal 43 toward the crankcase side may be designed to be blocked by the flange 22*a* of the second balance shaft 22 or the thrust plate 36 without provision of the flange portion 44, whereby the formation of the through hole 42 is eased. Furthermore, the axial gap between the restricting portions 51, 56, 61, 64 of the retaining plates 50, 53, 60, 63 and the boss portion 7*e* may be eliminated. In other words, the restricting portions 51, 56, 61, 64 and the boss portion 7*e* may be brought into abutment with each other in the axial direction.

In the first and second embodiments, while the retaining plates 50, 53 are fastened together with the pump body 7 with the bolt A1 for fastening the pump body 7 to the cylinder block 3, the retaining plates 50, 53 do not have to be fastened to the cylinder block 3 together with the pump body 7 and may be fastened to the pump body 7 with a separate volt.

In the first and second embodiments, while the retaining plates 50, 53 are fastened together with the pump body 7 with the bolt A1 for fastening the pump body 7 to the cylinder block 3, the retaining plates 50, 53 do not have to be fastened to the cylinder block 3 together with the pump body 7 and may be fastened to the pump body 7 with a separate bolt.

In the third and fourth embodiments, an engagement portion may be provided on a member situated in the interior of the cover 40 such as the pump body 7, and a curved portion may be provided on the retaining plates 60, 63 for engagement with the engagement portion for preventing the rotation of the retaining portions 60, 63. As this occurs, the engagement portion may be formed into a recessed portion or a raised portion, while the rotation preventing portion adapted to be brought into engagement with the engagement portion may be formed in a raised portion or a recessed portion for engagement with the recessed portion or the raised portion, respectively.

In the respective embodiments, while the machine having the oil seal has been described as being the internal combustion engine, the invention may be applied to an engine other than the internal combustion engine or a pump or the like.

What is claimed is:

1. A machine having an oil seal comprising:

a housing having a through hole formed therein for allowing a rotatable shaft to pass therethrough;

said through-hole being defined by a cylindrical wall forming an oil seal seat concentrically disposed with respect to said rotatable shaft;

said oil seal extending concentrically between said rotatable shaft and said cylindrical wall and including at least a portion being mounted in said oil seal seat between said rotating shaft and said housing;

a cover mounted on said housing so as to abut with a mating surface of said housing in such a manner as to cover the entirety of said oil seal;

a retaining member occupying a retaining position covering at least part of said oil seal seat in the interior of said housing, said retaining member being detachably fixed by a fixing member so that said oil seal is retained at an axial set position in said oil seal seat by said retaining member; and, confirmation means detectable from outside said cover for confirming the operability of said retaining member.

2. The machine as set forth in claim 1, wherein said confirmation means is an extending portion of said retaining member which extends to the outside of said cover.

3. The machine as set forth in claim 2, wherein said retaining member is fixed to said housing at said extending portion by said fixing member.

4. The machine as set forth in claim 1, including a gap formed between the interior of said cover and said housing, wherein said retaining member is insertable into said gap to be fixedly positioned with respect to said oil seal seat by association with elastic deformation of said cover.

5. The machine as set forth in claim 1, wherein said confirmation means is an opening formed in said cover exposing said retaining member to viewing from outside said cover.

6. The machine as set forth in claim 5, wherein said retaining member includes a fixing portion for fixing said retaining member to the circumferential wall of said housing at the interior of said cover, and a shielding portion extending from said fixing portion in an axial direction of said rotating shaft by folding said retaining member so that said shielding portion confronts with said opening.

7. The machine as set forth in claim 1, wherein said retaining member which is to be fixed to said housing by said fixing member is a retaining plate formed of a sheet material, and wherein said retaining plate includes a curved portion for engagement with an engagement portion provided on said housing to thereby prevent the rotation thereof.

8. The machine as set forth in claim 7, wherein said engagement portion is formed on said mating surface of said housing, and said curved portion of said retaining plate is interposed between said housing and said cover.

9. The machine as set forth in claim 1, wherein said retaining member, which is operative to be fixed to said housing by said fixing member, is a retaining plate formed of a sheet material, and wherein said retaining plate includes a restricting portion formed in a semi-annular shape, or a substantially U-shape.

10. The machine as set forth in claim 9, wherein said restricting portion covers said oil seal at a side closest to an edge wall of said housing.

11. The machine as set forth in claim 1, wherein said retaining member which is to be fixed to said housing by said fixing member is a retaining plate formed of a sheet material, and wherein said retaining plate is fastened to said housing together with a pump body.

12. The machine as set forth in claim 1, wherein said retaining member which is to be fixed to said housing by said fixing member is a retaining plate formed of a sheet material, and wherein said retaining plate is fastened to said housing together with a clamp.

13. A machine having an oil seal comprising:

a housing having a through-hole formed therein for allowing a rotatable shaft to pass therethrough, said rotatable shaft being a balance shaft for an engine;

said through-hole being defined by a cylindrical wall forming an oil seal seat concentrically disposed with respect to said rotatable shaft;

said oil seal extending concentrically between said rotatable shaft and said cylindrical wall and including at least a portion being mounted in said oil seal seat between said rotating shaft and said housing;

a cover mounted on said housing so as to abut with a mating surface of said housing in such a manner as to cover the entirety of said oil seal; and a retaining member occupying a retaining position covering at least part of an axial end of said oil seal seat in the interior of said housing, said retaining member being detachably fixed by a fixing member so that said oil seal is retained at an axial set position in said oil seal seat by said retaining member, said retaining member including an extending portion which extends to the outside of said cover, to thereby confirm the mounting of said retaining member from the outside of said cover.

14. A machine having an oil seal comprising:

a housing having a through-hole formed therein for allowing a rotatable shaft to pass therethrough, said rotatable shaft being a balance shaft for an engine;

said through-hole being defined by a cylindrical wall forming an oil seal seat concentrically disposed with respect to said rotatable shaft;

said oil seal extending concentrically between said rotatable shaft and said cylindrical wall and including at least a portion being mounted in said oil seal seat between said rotating shaft and said housing;

a cover mounted on said housing so as to abut with a mating surface of said housing in such a manner as to cover the entirety of said oil seal; and, a retaining member occupying a retaining position covering at least part of an axial end of said oil seal seat in the interior of said housing, said retaining member being detachably fixed by a fixing member so that said oil seal is retained at an axial set position in said oil seal seat by said retaining member, wherein said cover contains an opening for allowing said retaining member to be seen therethrough from outside said cover, to thereby confirm the mounting of said retaining member.

* * * * *